United States Patent [19]

Mase

[11] Patent Number: 4,513,805

[45] Date of Patent: Apr. 30, 1985

[54] DECELERATOR FOR USE IN ROLLER BLINDS

[75] Inventor: Ryoichi Mase, Tokyo, Japan

[73] Assignee: Toso Kabushiki Kaisha, Tokyo, Japan

[21] Appl. No.: 486,577

[22] Filed: Apr. 19, 1983

[30] Foreign Application Priority Data

Apr. 30, 1982 [JP] Japan .......................... 57-61938[U]

[51] Int. Cl.[3] ........................ F16H 3/44; F06B 9/208

[52] U.S. Cl. ................................ 160/299; 74/781 R

[58] Field of Search ................ 74/781 R, 781 B, 784; 160/299, 298, 310, 319

[56] References Cited

U.S. PATENT DOCUMENTS

| | | | |
|---|---|---|---|
| 219,747 | 9/1879 | Macy | 160/299 |
| 1,494,503 | 5/1924 | Rackham | 74/781 R |
| 2,332,588 | 10/1943 | Moffitt | 74/781 R |
| 2,892,521 | 6/1959 | Spencer | 74/781 B X |
| 3,285,089 | 11/1966 | Isugawa | 160/310 X |
| 3,388,617 | 6/1968 | Nelson | 74/781 B X |
| 4,059,339 | 11/1977 | Brown | 160/310 X |
| 4,172,563 | 10/1979 | Werner et al. | 160/310 X |

FOREIGN PATENT DOCUMENTS

| | | | |
|---|---|---|---|
| 519735 | 6/1921 | France | 160/299 |
| 756882 | 12/1933 | France | 74/781 B |
| 1366457 | 12/1964 | France | 74/781 B |
| 36185 | 3/1980 | Japan | 74/781 R |
| 11118 | of 1887 | United Kingdom | 160/299 |

*Primary Examiner*—George H. Krizmanich
*Assistant Examiner*—Dirk Wright
*Attorney, Agent, or Firm*—Birch, Stewart, Kolasch & Birch

[57] ABSTRACT

In roller blinds of the type having a spring-motor interposed between a fixed shaft and a tube to wind up a screen on the tube, a decelerator comprising a one-way clutch mounted on the fixed shaft, an epicyclic gearing having a sun gear, planet gears rotatably supported by the one-way clutch, and a ring gear coaxially secured to the inside of the tube, and a centrifugal brake having a brake drum secured to the inside of the tube, a rotary shaft directly connected to the sun gear, and centrifugally expansible brake shoes mounted on the rotary shaft for frictional engagement with the brake drum.

The one way clutch permits the planet gears to rotate about the sun gear together with the tube when the screen is payed out. But, it prevents the planet gears from rotating about the sun gear when the screen is wound up by the spring-motor, resulting in that the sun gear or rotatary shaft rotates more rapidly in the direction opposite to the tube to force the brake shoes against the brake drum.

5 Claims, 4 Drawing Figures

DECELERATOR FOR USE IN ROLLER BLINDS

BACKGROUND AND SUMMARY OF THE INVENTION

This invention relates to a decelerator for use in roller blinds of the type having a spring-motor to wind up a screen on a tube.

The spring-motor type roller blind is desirably equipped with a decelerator to reduce the screen-winding speed to the extent that the screen is always wound up at moderate speeds even if it is fully payed out and then released. Otherwise, it is caused to rise rapidly and make a noise by a strong resilience accumulated in the spring-motor while it is payed out. The decelerator as conventionally used in the roller blind is one among air-damper, oil-damper and fly-wheel type brakes, therefore disadvantageously requiring an accurate adjustment for desired performance.

It is the primary object of the invention to provide such a decelerator for use in roller blinds that is needless to be accurately adjusted for desired performance.

For accomplishment of the object, the decelerator of the invention is used in roller blinds of the type having a spring-motor interposed between a fixed shaft and a tube, and composed of a one-way clutch having the stator thereof secured to the fixed shaft, an epicyclic gearing having a ring gear secured to the inside of the tube, a sun gear, a plurality of planet gears rotatably supported by the rotator of the one-way clutch, and a centrifugal brake having a rotary member secured to the sun gear, centrifugally expansible brake shoes mounted on the rotary member and a brake drum secured to the inside of the tube. The one-way clutch permits the planet gears to rotate about the sun gear with the ring gear or tube in the direction in which the screen is payed out but prevents the planet gears from rotating about the sun gear with the ring gear or tube in the opposite direction. The sun gear or rotary member rotates in the direction opposite to that of the tube at a speed that is a preselected number of times as large as that of the tube when the screen is wound up, so that the brake shoe is forced against the brake drum with a pressure in proportion to the screen-winding speed. The ring gear as well as the brake drum is preferably fixed to the inside of the tube with the intervention of a sound absorbing member in a manner that the screen is quietly wound up.

Other objects and advantages of the invention will in part be obvious and will in part appear hereinafter.

DESCRIPTION OF THE PREFERRED EMBODIMENT

Figure 1:
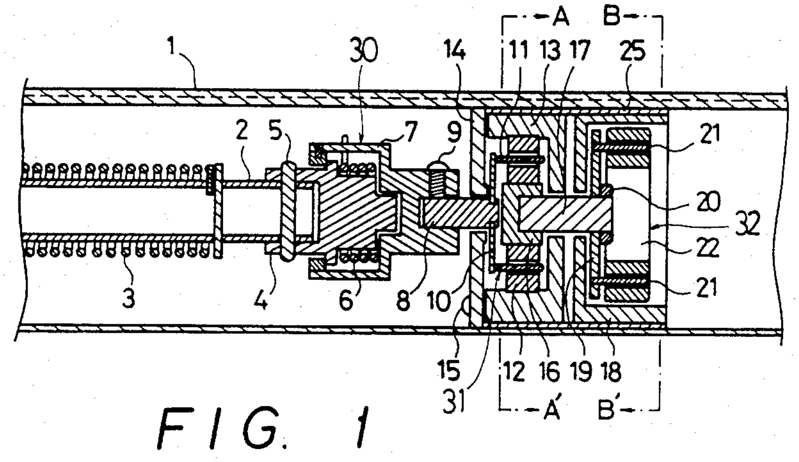
FIG. 1 is a longitudinal section of the relevant portion of the roller blind equipped with the decelerator of the invention.

As seen in FIG. 1, a fixed shaft 2 passes axially through a tube 1 on which a non-illustrated screen is wound. The fixed shaft 2 has one end thereof secured to one of both non-illustrated brackets. A spring-motor 3 is loosely fitted over the fixed shaft 2 and has a non-illustrated end secured to the tube and the other end fixed to the fixed shaft 2.

A one-way clutch 30 has a stator 4 secured to the fixed shaft 2 by a knock pin 5, a brake coil spring 6 fitted on the stator 34 and a rotator 7 loosely fitted on the brake coil spring 6. The brake coil spring 6 has one end thereof connected to the stator 4 and the other end connected to the rotator 7, so that the rotator 7 is freely rotatable in one direction in which the coil spring 6 is loosened and prevented from rotating in the other direction in which the coil spring 6 is tightened on the stator 4. A center shaft 8 has on end thereof fixed to the rotator 7 by a set screw 9 and the other end passing through a gearing cover 14 of an epicyclic gearing 31. The epicyclic gearing 31 has a disk 10 fixed to the other end of the center shaft 8, a plurality of axes 11 extending from the disk 10, a planet gear 12 rotatably fitted on each axis 11, a ring gear 13 secured to the inside of the tube 1 with the intervention of a sound-absorbing member 25 of rubber and in mesh with the planet gears 12 and a sun gear 16 compassed by and in mesh with the planet gears 12. The gearing cover 14 is removably fixed to the ring gear 13 by set screw 15.

A centrifugal brake 32 has a rotary shaft 17 directly connected to the sun gear 16 and an arm 19 fixed to the rotary shaft 17 by a nut 20, a pair of pins 21 secured to the both ends of the arm 19, a weight 22 rotatbly fitted on each pin 21, and a brake drum 18 secured to the inside of the tube 1 with the intervention of common sound-absorbing member 25.

Figure 2:
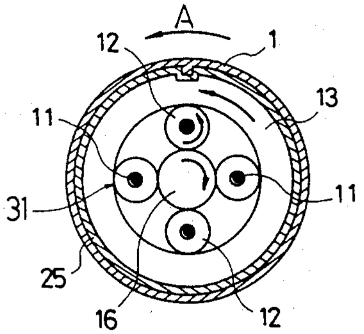
FIG. 2 is a section along line of II—II of FIG. 1, illustrating the epicyclic gearing.

Referring to FIG. 2 in which is shown the epicyclic gearing 31, the tube 1 has an inner projection fitted in the groove of the ring gear 13 with the intervention of sound-absorbing member 25 of rubber. As the tube 1 rotates together with the ring gear 13 in the direction in which the screen (not shown) is payed out, the planet gears 12 rotate about the respective axes 11 which remain unmoved, resulting in that the sun gear 16 rotates in the direction opposite to that of the ring gear 13 at a speed enlarged by a number corresponding to the ratio of teeth number of ring gear 13 to sun gear 16.

Figure 3:
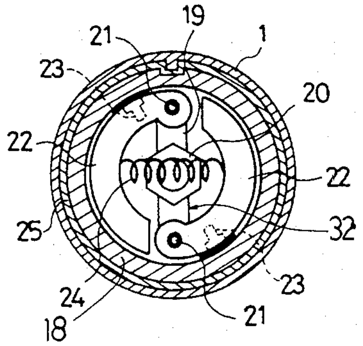
FIG. 3 is a section along line of III—III of FIG. 1, illustrating the centrifugal brake.

Referring to FIG. 3 in which is shown the centrifugal brake 32, the tube 1 has an inner projection fitted in the recess in the outer periphery of the brake drum 18 with the intervention of the absorbing rubber 25. The both arcuate weights 22 with the brake shoes 23 are rotatable about the respective pins 21 on the arm 19 and pulled to each other by a coil spring 24 behind the nut 20.

Figure 4:
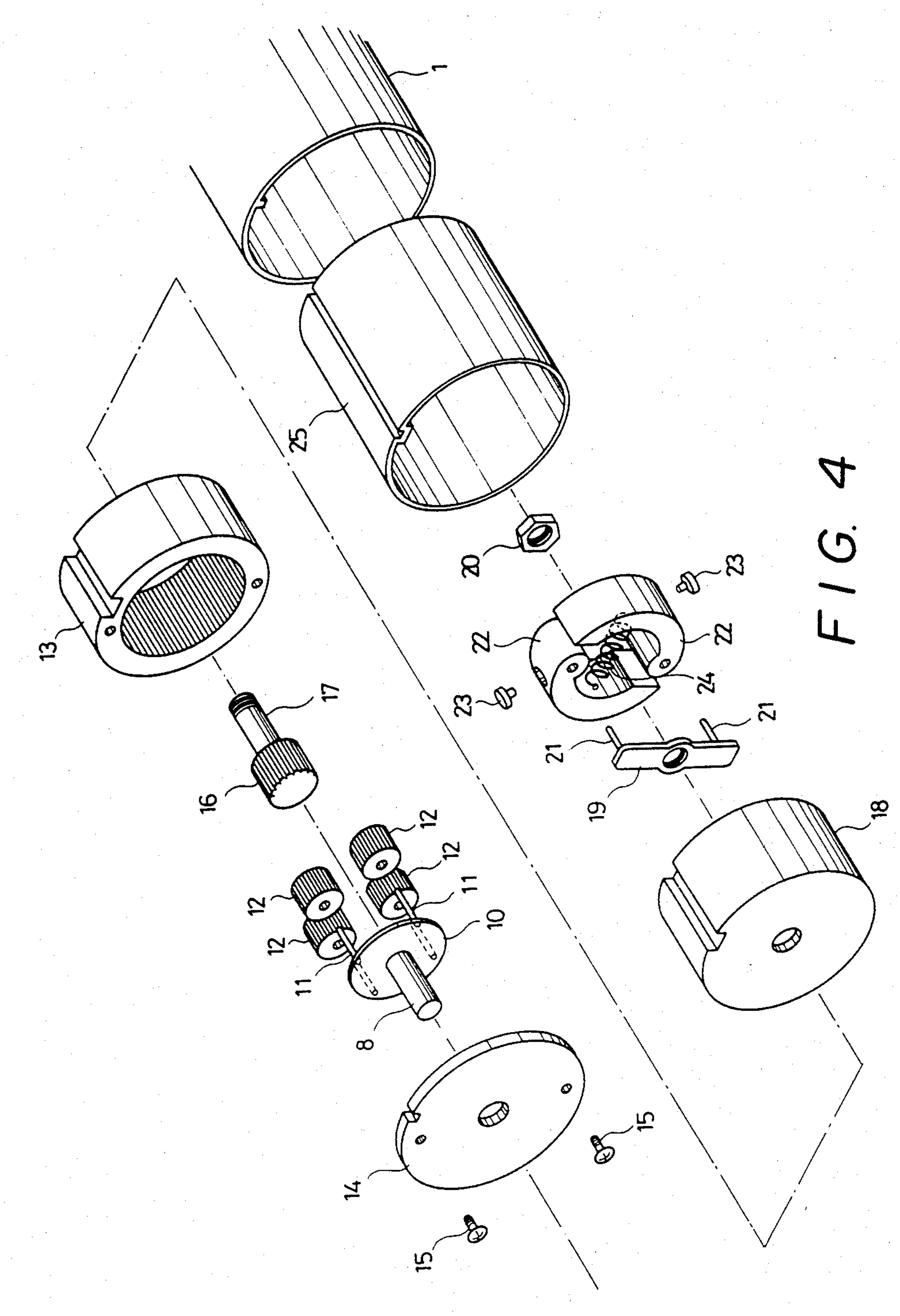
FIG. 4 is a pictorial view of the roller blind of FIG. 1 in disassembled position.

As seen in FIG. 4, the center shaft 8 has an end to pass through the center bore in the gearing cover 14 which is removably fixed to the front of the ring gear 13 by two set screws 15 and the other end fixed to the disk 10 on which four axes 11 are equidistantly concyclic about the center shaft 8. Four planet gears 12 are rotatably fitted on the associated pins 11 and in mesh both with the ring gear 13 and with sun gear 16. The sun gear 16 is secured to rotary shaft 17 passing through the center bore of brake drum 18. The arm 19 is fixed to rotary shaft 17 by nut 20 and extends diametrically therefrom. The arm 19 is provided at the opposite ends with two pins 21 on which a pair of arcuate weights 22 rotatably fitted. Both the weights 22 have a common coil spring 24 to pull against each other and the respective brake shoes 23 embedded in their outer side. The ring gear 13 and the brake drum 18 are secured to tube 1 with the intervention of common sound-absorbing rubber 25 for rotation as one body.

In operation, the brake coil spring 6 of FIG. 1 loosens when the rotator 7 or pins 11 rotates in the direction opposite to the arrow A of FIG. 2. Therefore, ring gear 13, planet gears 12, and sun gear 16 rotates together with tube 1, as one body, while the screen (not shown) is payed out to rotate tube in the direction opposite to the arrow A of FIG. 2.

On the other hand, brake coil spring 6 fastens on stator 4 to prohibit rotator 7 or pins 11 to rotate in the direction of the arrow A of FIG. 2. When the tube 1 rotates in the direction of the arrow A of FIG. 2 to wind up the screen (not shown), the sun gear 16 turns in the direction opposite to that of tube 1 at a rotational speed increased by a factor of the number equal to the teeth number ratio of ring gear 13 to sun gear 16. This means that there occurs a great peripheral speed difference between brake drum 18 and brake shoe 23, because the teeth number ratio is more than three. As the rotary speed of sun gear 16 exceeds a predetermined value, arcuate weights 22 have a centrifugal force overcoming a compression force of coil spring 24 and expand brake shoes 23 against brake drum 18. Thus, the brake shoe 23 exerts a centrifugally braking force in proportion to the rotary speed of tube 1 on brake drum 18, so that the screen-winding speed is always reduced to the extent that the screen is quietly wound up even if the screen is fully payed out and then released. The teeth number of the ring gear, the sun gear, and the planet gear, the number of the brake shoes and the shape of the arcuate weight may differ from those as seen in the drawings.

The sound-absorbing member 25 absorbs noise produced both by gearing engagement among ring gear 13, planet gears 12, and sun gear 16 and by frictional contact between brake drum 18 and brake shoes 23 with the result that screen-winding is always performed without noise.

From the foregoing, it will be understood that the decelerator of the invention needs no accurate adjustment for desired performance, because of having a centrifugal braking action corresponding to the rotary speed of the tube on which the screen is wound up.

What is claimed is:

1. A decelerator for use in roller blinds of the type having a spring-motor interposed between a fixed shaft and a tube, comprising one-way clutch means having the stator thereof secured to the fixed shaft, epicyclic gearing means having a rear gear secured to the inside of the tube, a sun gear, a plurality of planet gears rotatably supported by the rotator of said one-way clutch means to engage said sun gear and said ring gear, and centrifugal braking means having a brake drum secured to the inside of the tube, a rotary shaft fixed to said sun gear, and centrifugally expansible brake shoes mounted on said rotary shaft, said one-way clutch permitting said planet gears to rotate about said sun gear together with the tube in a given direction but preventing said planet gears from rotating about said sun gear with the tube in the opposite direction.

2. A decelerator as claimed in claim 1, wherein said ring gear and said brake drum are secured to the inside of the tube with the intervention of a sound-absorbing member.

3. A decelerator as claimed in claim 1, wherein said rotary shaft is provided with an arm diametrically extending therefrom, said brake shoes being pivotally connected to the end portion of said arm.

4. A decelerator as claimed in claim 3, wherein said brake shoe includes an arcuate weight and a frictional brake embedded in the outer side of said arcuate weight, said both arcuate weights pulling against each other with the intervention of a spring member interposed therebetween.

5. A decelerator as claimed in claim 1, wherein said one-way clutch means includes a brake coil spring having one end thereof connected to the stator and the other end connected to the rotator, said brake coil spring loosening to permit the rotator to rotate about said sun gear when the tube rotate in said given direction and fastening on the stator to prevent said planet gears from rotating about said sun gear when the tube rotates in the opposite direction.

* * * * *